UNITED STATES PATENT OFFICE.

CLINTON E. DOLBEAR, OF BERKELEY, CALIFORNIA, ASSIGNOR TO ELIJAH H. MERRILL, OF BERKELEY, CALIFORNIA.

PROCESS OF RECOVERING SODIUM AND POTASSIUM SALTS FROM MIXTURES THEREOF.

1,088,333.   Specification of Letters Patent.   Patented Feb. 24, 1914.

No Drawing.   Application filed April 10, 1912. Serial No. 689,877.

*To all whom it may concern:*

Be it known that I, CLINTON E. DOLBEAR, a citizen of the United States, residing at Berkeley, in the county of Alameda and State of California, have invented new and useful Improvements in Processes of Recovering Sodium and Potassium Salts from Mixtures Thereof, of which the following is a specification.

The present invention relates to a method of separately recovering the more valuable constituents of a saline liquor such as is found in Searles Borax Lake in San Bernardino county, California. The constituent salts of this liquor are: sodium chlorid, about 1/2, sodium sulfate, about 1/6, sodium carbonate about 1/7, potassium chlorid, about 1/7, sodium biborate about 1/21.

The object of the invention is to provide a process by which the valuable constituents of said liquor may be recovered at a cost sufficiently low to permit of its commercial use.

The following are the steps of my improved process: The $Na_2CO_3$ is precipitated as $NaHCO_3$ by passing $CO_2$ through the solution. The solution is then treated with a more or less soluble compound of an alkaline earth metal, such as $Ca(OH)_2$ or $CaCl_2$ whereby the $Na_2B_4O_7$ is converted into $CaB_4O_7$ and $2NaOH$, or $2NaCl$, as the case may be. The $CaB_4O_7$ is insoluble and precipitates out. The remaining solution is then subjected to evaporation at a temperature greater than 33° C. until saturated with KCl, whereby NaCl and $Na_2SO_4$ are partially crystallized out, and then in a separate vessel to a lowering of temperature whereby KCl is partially crystallized out. The lower temperature should not be below 18° C., below which $Na_2SO_4.10H_2O$ would re-form and precipitate. At the above temperatures, the $Na_2SO_4$ is precipitated with the NaCl. The residual solution, after partial evaporation at a temperature above 33° C. and after subsequent partial separation of potassium chlorid (KCl) therefrom by cooling to a temperature not below 18° C. is then added to the residual solution which remains when sodium carbonate ($Na_2CO_3$) and the boric acid of sodium biborate ($Na_2B_4O_7$) have been separated from the lake liquor by carbon dioxid ($CO_2$) and by a more or less soluble compound of an alkaline earth metal, such as calcium hydroxid ($CaO_2H_2$) or calcium chlorid ($CaCl_2$) respectively. The resulting (combined) solution is then treated by partial evaporation at a temperature above 33° C. for separation together of sodium chlorid and sodium sulfate and by cooling to separate potassium chlorid, the cooling not being carried below 18° C. in order to avoid separation of sodium sulfate in hydrated form ($Na_2SO_4.10H_2O$) along with the potassium chlorid.

In this process I am enabled to utilize the evaporative power of the dry air of the desert in which the liquor is found, and I further utilize the great heat given by the sun in such locations to obtain the heat necessary for evaporation at a comparatively high temperature. To obtain the cooling effect, also necessary for fractional crystallization, I evaporate rapidly, as by means of spray. Moreover this process has the advantage that thereby the potassium chlorid is separated in a single step from the sodium sulfate as well as from the sodium chlorid.

In an application which I filed of even date herewith and which has been officially numbered 689,878 I have described a process for separately recovering saline substances from the aforesaid liquor of Searles Borax Lake which consists in (1) subjecting such liquor to evaporation at a temperature greater than 33° C. until the solution becomes saturated with some one or more of the other contained salts in order to crystallize sodium chlorid and sodium sulfate out of the solution, (2) lowering the temperature to not below 18° C. in order to crystallize out a mixture of sodium carbonate, sodium biborate and potassium chlorid, (3) redissolving this latter mixture in order to form a solution of the three salts, (4) passing carbon dioxid through this solution in order to precipitate sodium bicarbonate, (5) treating the residual solution with a more or less soluble compound of an alkaline earth metal, such as calcium hydroxid or calcium chlorid, in order to obtain the boric acid of the sodium biborate in an insoluble form, and (6) evaporating the then remaining solution in order to recover potassium chlorid.

Those features (to wit, all and singular the new, useful and original parts, improvements and combinations) which are common to the two processes are intended to be claimed herein. Those features in which the processes differ from each other are severally claimed in the respective applications.

I claim:—

1. The method of separately recovering saline substances from a solution containing sodium carbonate, sodium biborate, potassium chlorid, sodium sulfate and sodium chlorid, which consists in, first, passing through the solution carbon dioxid to form and precipitate sodium bicarbonate, secondly, mixing the solution with a more or less soluble compound of an alkaline earth metal to precipitate therefrom the corresponding biborate, and then partially separating the potassium chlorid from the sodium sulfate and sodium chlorid by subjecting the remaining solution to evaporation at a temperature greater than 33° C. and to a lowering of the temperature to not below 18° C.

2. The method of separately recovering saline substances from a solution containing sodium carbonate, sodium biborate, potassium chlorid, and sodium chlorid, which consists in, first, passing through the solution carbon dioxid to form and precipitate sodium bicarbonate, second, mixing the solution with a more or less soluble compound of an alkaline earth metal to precipitate therefrom the corresponding biborate, and then partially separating the potassium chlorid from the sodium chlorid by subjecting the remaining solution to evaporation at a higher temperature and to a lowering of the temperature.

3. The method of separately recovering saline substances from a solution containing sodium carbonate, sodium biborate, potassium chlorid, sodium sulfate and sodium chlorid, which consists in, first, passing through the solution carbon dioxid to form and precipitate sodium bicarbonate, secondly, mixing the solution with a more or less soluble compound of an alkaline earth metal to precipitate therefrom the corresponding biborate, then partially separating the potassium chlorid from the sodium sulfate and sodium chlorid by subjecting the remaining solution to evaporation at a temperature greater than 33° C. and then to a lowering of the temperature to not below 18° C., then mixing the residual solution with a further residual solution obtained by subjecting a succeeding supply of the original solution to the first and second above-named steps, subjecting the mixture to the third-named step, and continuing the process indefinitely.

4. The method of separately recovering saline substances from a solution containing sodium carbonate, sodium biborate, potassium chlorid and sodium chlorid, which consists in, first, passing through the solution carbon dioxid to form and precipitate sodium bicarbonate, secondly, mixing the solution with a more or less soluble compound of an alkaline earth metal to precipitate therefrom the corresponding biborate, and then partially separating the potassium chlorid from the sodium chlorid by subjecting the remaining solution to evaporation at a higher temperature and then to a lowering of the temperature, then mixing the residual solution with a further residual solution obtained by subjecting a succeeding supply of the original solution to the first and second above-named steps, subjecting the mixture to the third-named step, and continuing the process indefinitely.

5. The method of separately recovering saline substances from a solution containing sodium and potassium salts, which method consists in (1) mixing such a solution whose salts include both sodium sulfate and sodium biborate in addition to potassium chlorid with a more or less soluble compound of an alkaline earth metal in order to obtain the boric acid of said sodium biborate in an insoluble form, (2) heating the residual solution to a temperature above 33° C. in order to have said solution in a condition in which its capacity to hold sodium sulfate in solution decreases with increase of temperature and increases with decrease of temperature, (3) bringing said solution to saturation with potassium chlorid while said solution remains in the condition mentioned with respect to sodium sulfate, and (4) lowering the temperature of the solution to not below 18° C. in order to separate potassium chlorid while the sodium sulfate remains in solution.

6. The method of separately recovering saline substances from a solution containing sodium and potassium salts, which method consists in subjecting such a solution whose salts include both sodium carbonate and sodium biborate in addition to potassium chlorid to the action (1) of carbon dioxid in order to convert sodium carbonate into sodium bicarbonate and (2) of a more or less soluble compound of an alkaline earth metal in order to convert the boric acid of the sodium biborate into a salt of said alkaline earth metal, the joint result of the two reactions being to obtain the sodium carbonate of said solution and the boric acid of the sodium biborate thereof in forms in which they are readily separable from each other and from the potassium salt.

7. The method of separately recovering saline substances from a solution containing sodium and potassium salts, which method consists in (1) heating such a solution whose salts include sodium sulfate and potassium chlorid to a temperature above 33° C. in order to have said solution in a condition in which its capacity to hold sodium sulfate in solution decreases with increase of temperature and increases with decrease of temperature, (2) bringing such solution to saturation with potassium chlorid while the solution remains in the condition mentioned with respect to sodium sulfate, and (3) lowering the temperature of the solution to not below 18° C. in order to separate potassium chlorid while the sodium sulfate remains in solution.

8. The method of separately recovering saline substances from a solution containing sodium and potassium salts, which method consists in subjecting such a solution whose salts in part decrease and in part increase in solubility in the mother liquor with lowering of temperature and include sodium biborate in addition to potassium chlorid (1) to the action of a more or less soluble compound of an alkaline earth metal in order to convert the boric acid of said sodium biborate into a salt of the alkaline earth metal and (2) to a cooling of the solution saturated with potassium chlorid through a temperature interval in which part of the original salts increase in solubility as the temperature is lowered in order to separate potassium chlorid from such part of the original salts.

9. The method of recovering saline substances from a solution of alkaline salts, which method consists in (1) heating to a temperature above 33° C. a solution of such salts which include sodium sulfate in addition to a salt whose solubility in the mother liquor at temperatures above 18° C. decreases with a cooling of said solution in order by such heating to have said solution in a condition in which its capacity to hold sodium sulfate in solution decreases with increase of temperature and increases with decrease of temperature, (2) bringing such solution to saturation with said additional salt while said solution remains in the condition mentioned with respect to sodium sulfate, and (3) lowering the temperature of the solution to not below 18° C. in order to separate said additional salt while the sodium sulfate remains in solution.

In testimony whereof I have hereunto set my hand in the presence of two subscribing witnesses.

CLINTON E. DOLBEAR.

Witnesses:
FRANCIS M. WRIGHT,
D. B. RICHARDS.